(No Model.)　　　　　　　　　　2 Sheets—Sheet 1.
E. H. FOSS.
BICYCLE.
No. 302,329.　　　　　　Patented July 22, 1884.
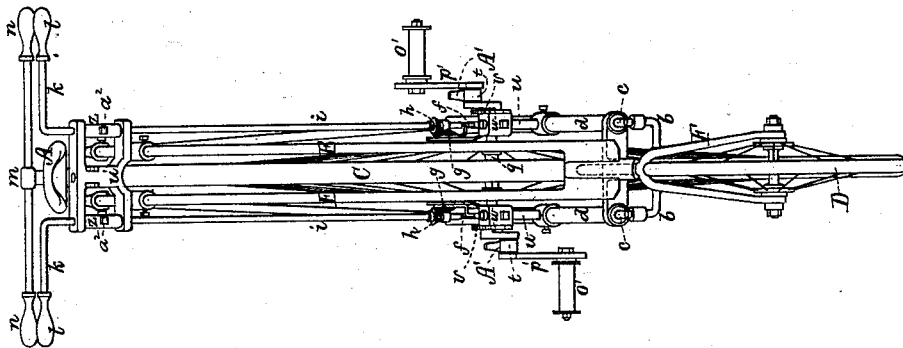
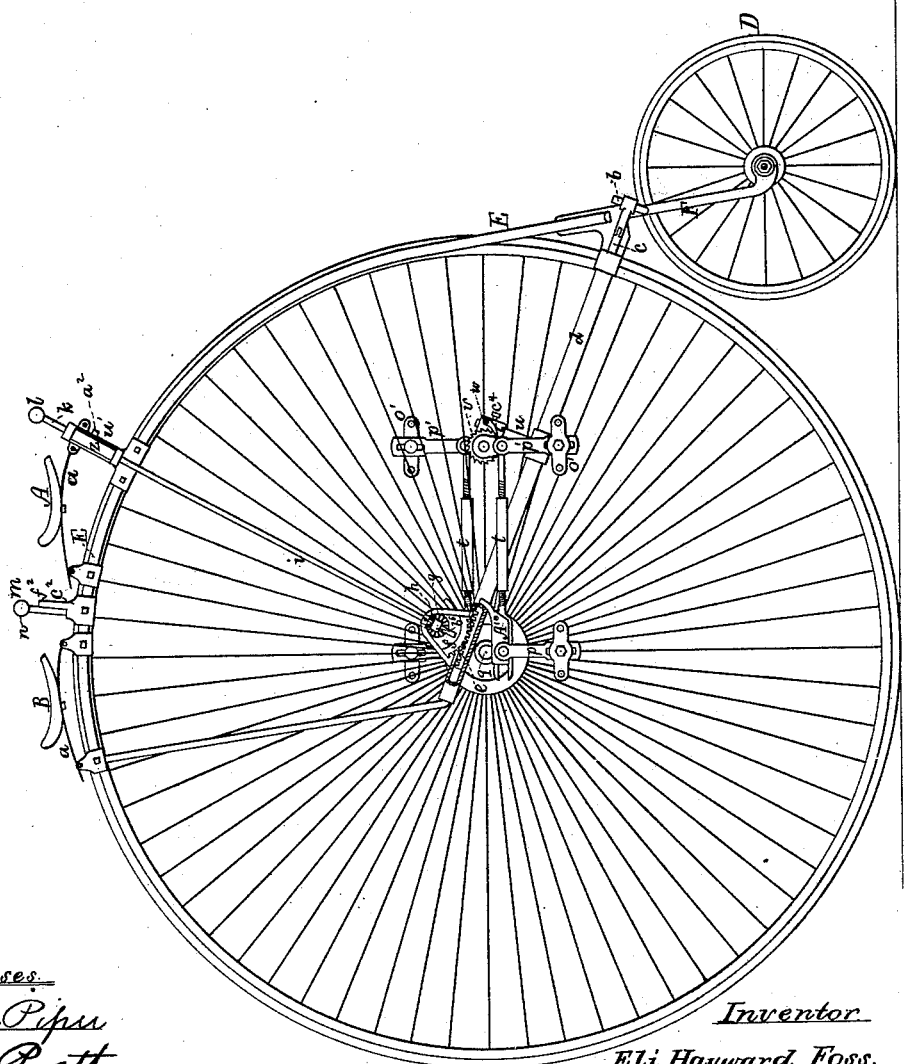
Witnesses.
S. N. Piper
E. B. Pratt.
Inventor
Eli Hayward Foss.
by R. H. Eddy atty.

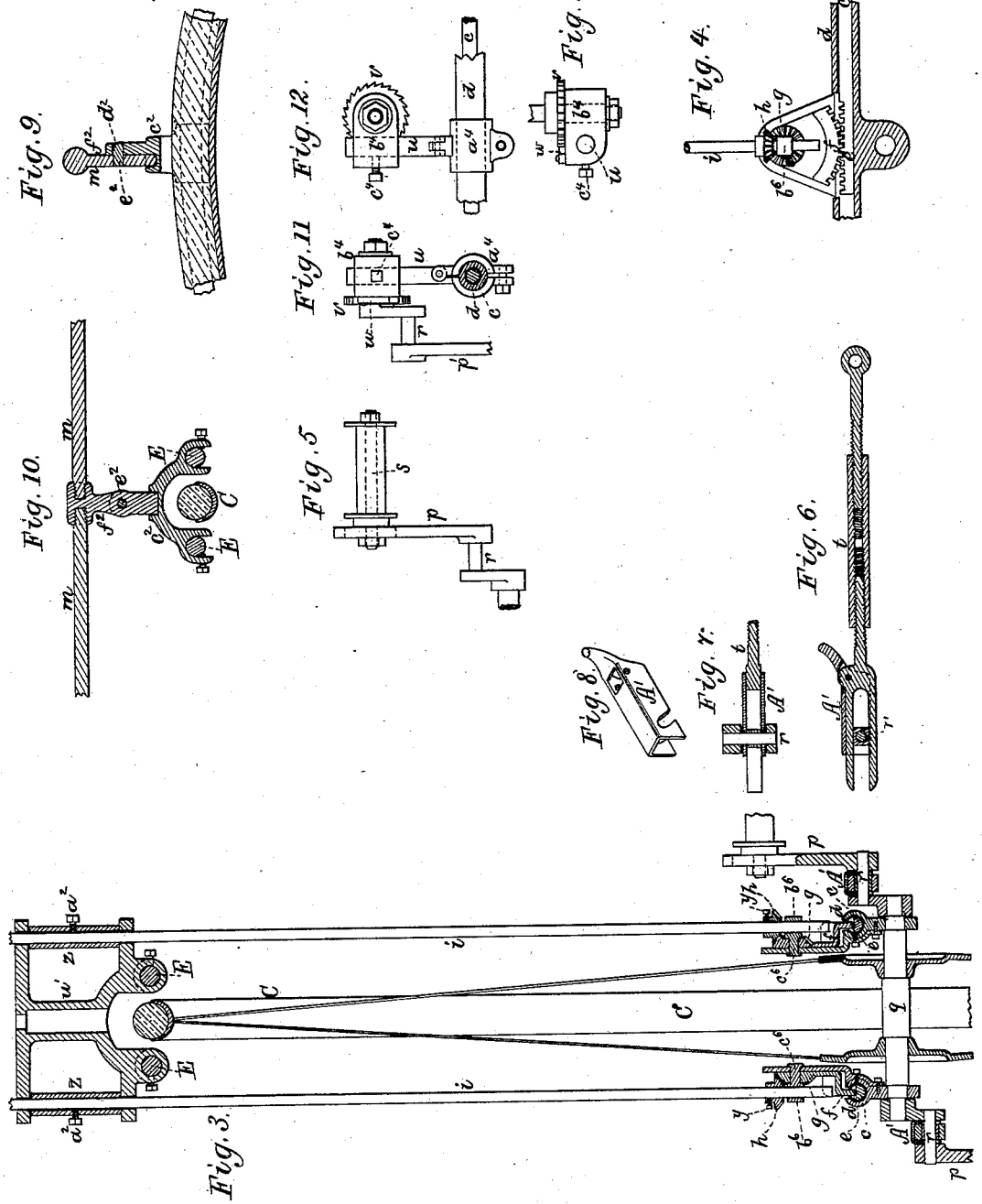

UNITED STATES PATENT OFFICE.

ELI HAYWARD FOSS, OF CAMPELLO, MASSACHUSETTS.

BICYCLE.

SPECIFICATION forming part of Letters Patent No. 302,329, dated July 22, 1884.

Application filed May 5, 1884. (No model.)

*To all whom it may concern:*

Be it known that I, ELI HAYWARD FOSS, of Campello, in the county of Plymouth, of the Commonwealth of Massachusetts, have invented a new and useful Improvement in Bicycles; and I do hereby declare the same to be described in the following specification and represented in the accompanying drawings, of which—

Figure 1 is a side elevation, Fig. 2 a front end view, of a bicycle provided with my invention, the nature of which is defined in the claims hereinafter presented. Fig. 3 is a transverse section on an enlarged scale, taken through the axis of the larger wheel, and also through the steering mechanism shafts, to be described. Fig. 4 is a front view on an enlarged scale of one of the toothed racks $e$, its operative sector, and the actuating-gear of the latter. Fig. 5 is a side view of one of the duplex cranks of the pedals. Fig. 6 is a vertical and longitudinal section on an enlarged scale of the connecting-rod $t$ and its latch for connecting such rod with the inner duplex crank. Fig. 7 is a horizontal section of the said crank, latch, and rod, while Fig. 8 is a perspective view of the latch. Fig. 9 is a vertical and transverse section of the handle-bar $m$ and its supporting-abutment, while Fig. 10 is a longitudinal section of the abutment and the upper part of the frame E. Fig. 11 is a front side elevation, Fig. 12 an inner side elevation, and Fig. 13 a top view, of the sustaining devices of one of the auxiliary cranks $p'$.

The bicycle is of a class termed "tandem" bicycles, it being calculated for two persons to sit—one in rear of the other—upon it and to operate it. To this end it has two seats, A and B, arranged over its main wheel C, such seats resting on springs $a$, arranged as shown in Fig. 1, and properly supported by the frame E, that straddles the said wheel C. The auxiliary or steering wheel D is shown as arranged in front of the said main wheel and having its journals supported in a fork, F, whose shank is adapted to turn in the frame E. From the prongs of the fork two arms, $b$, are projected in opposite directions, as shown in Fig. 2, each being jointed to one of two inclined rods, $c$, that extend into tubular portions $d\ d$ of the frame E. Each of such rods has at its upper end or part a toothed rack, as shown at $e$ in Fig. 1, and also in Fig. 4. A toothed sector, $f$, properly pivoted to the frame E and arranged over each rack, engages with the said rack, and is provided with a bevel-gear, $g$, to mesh into a bevel-pinion, $h$, fixed on a shaft, $i$, such shaft being suitably journaled in the frame $u'$. The upper portion, $k$, of each shaft $i$ is bent horizontally and provided with a handle, $l$, as shown in Fig. 2. A wheelman, when sitting on the seat A, is with his two hands to take hold of the two handles $l$, and, by moving them to turn the shafts $i$, he can turn the wheel D more or less laterally either way out of the plane of the wheel C, so as to change the direction of the advance of the bicycle. Between the two seats is a detachable transverse bar, $m$, terminating in handles $n\ n$, for the person who may occupy the rear seat to lay hold of to support himself, while his feet may be on the pedals of the cranks $p$ of the shaft $q$ of the main wheel. Each of the said cranks is a double or duplex crank, it being formed as represented in side view in Fig. 5, in which it is shown formed so as to have two wrists, $r\ s$, the outer one of which is for supporting the pedal, while there is pivoted on the inner one, $r$, a rod, $t$, which in like manner is applied to the corresponding wrist of another such duplex crank, $p'$, which is supported by a bracket, $u$, extending upward from the frame E. There is such a bracket, $u$, and duplex crank $p'$ on each side of the wheel C, pedals $o'$ being applied to the cranks $p'$. On the pedals $o'$ the feet of the rider of the front seat, A, are to rest. As the cranks $p'$ are revolved, they, through the connecting-rods $t$ and the cranks $p$, revolve the wheel C, the said cranks $p$ being further acted on by the feet of the party who may be upon the rear seat, B. Each connecting-rod $t$ is forked, and straddles the wrist $r$ of the crank $p$ in manner as shown in Fig. 6, and such rod has hinged to it a shoe or latch, A′, notched to receive the wrist of the crank when the latch is down, as shown in Fig. 6. On raising the latches out of engagement with the wrists, the cranks may be revolved without moving their connection-rods lengthwise, in which case the feet of the front rider may rest on the front pedals without turning them or their cranks. This is useful while the bicycle is descending a hill or declivity. The shafts $i$ $i$ are journaled in a head or frame, $u'$, adapted to slide on the frame E lengthwise thereof, and provided with screws or suitable means of clamping it, the said frame $u'$, in position. The object of having the frame $u'$ so movable is to enable the seat A to be arranged between the wheel D and the steering-arms $k$, when such wheel is to track in rear of the main wheel.

To one or each of the auxiliary duplex cranks $p'$ there is fixed a notched wheel, $v$, and to its bracket a pawl, $w$, to engage with such wheel, so as to prevent the front crank from having a pendulous motion while the rear crank might be in revolution, as the two cranks should revolve simultaneously in an entire circular path. The bracket $u$ (see Figs. 11, 12, and 13) is clamped on the tubular part $d$ of the frame E, the clamp with its screw being shown at $a^4$ in Figs. 11 and 12, such enabling the bracket to be adapted to project either above or below the part $d$. The crank-box $b^4$ is adjustable on the bracket—that is, adapted to slide upward or downward on the bracket—which is cylindrical above its clamp $a^4$, going through the box, such box having a screw, $c^4$, for clamping it to the bracket.

From the above it will be seen that the crank $p'$ is adjustable up or down relatively to the bracket, such being to properly adjust the pedal to the foot of the wheelman.

From the above it will also be seen that when two persons are occupying the seats A and B, with the feet of one on the main or rear pedals and those of the other on the auxiliary or front ones, they can put the bicycle in motion forward, and the front person can steer it either in a straight or in a curved direction, as occasion may require. Each shaft $i$ slides longitudinally in the hub of its beveled pinion $h$, and such hub has in it a set-screw, $y$, to clamp the pinion to the shaft. (See Fig. 3.) Furthermore, each shaft $i$ extends up through a tube, $z$, arranged, as shown, within the frame $u'$. A clamp-screw, $a^2$, screwed into the tube laterally and against the shaft, serves to confine the tube to the shaft. The object of the tube arranged on the shaft $i$ and within the frame $u'$ in manner as shown in Fig. 3, and having the beveled pinion movable on the shaft $i$, is to enable the handles of the shafts $i$ $i$ to be adjusted to such height as may be most convenient for a rider to hold and operate them. The bar $m$ of the handles $n$ $n$ is supported at its middle in the head of a short post, $f^2$, which at its foot is inserted in a socket in the base of an abutment, $c^2$, extending up from the frame E. This abutment has a hole, $d^2$, through it to receive a stud, $e^2$, projecting from the post, all being as shown in Fig. 9. The bar $m$, with its handles, becomes readily detachable from the frame E or applicable thereto, as occasion may require. Each shaft $i$ at its lowest part extends through and turns in a box, $b^6$, that is pivoted in the frame E, so as to turn therein with the shaft when the latter is moved with the frame $u'$, while the said frame may be in the act of being adjusted in the frame E. The toothed sector $f$ turns or is pivoted on the pivotal shank $c^6$ of the box $b^6$.

I claim—

1. The combination of the main wheel and its duplex cranks, the frame and its two seats, the auxiliary wheel and its supporting revoluble fork, the mechanism for turning said fork, the auxiliary duplex cranks, and their connecting-rods, all being arranged and applied substantially and to operate as specified.

2. The combination of the detachable rod $m$, the frame E, the two seats A and B, the main wheel C and its duplex cranks $p$, the auxiliary wheel D and its supporting revoluble fork F, the mechanism for turning the said fork, the auxiliary duplex cranks $p'$, and their connecting-rods $t$, all being arranged and applied substantially and to operate as set forth.

3. The combination, substantially as set forth, for turning the fork F of the auxiliary wheel, such combination consisting of the arms $b$, rods $c$, racks $e$, toothed sectors $f$, bevel-gears $g$ $h$, shafts $i$, and their bent portions $k$, provided with handles $l$, all being arranged and applied as represented.

4. The combination of the ratchet $v$ and its pawl $w$ with the auxiliary duplex cranks, their connecting-rods, the main duplex cranks, the frame with its seats, revoluble fork, main wheel, auxiliary wheel, and mechanism for turning the said fork, all being substantially as set forth.

5. Each connecting-rod $t$ as forked and provided with the latching-shoe to connect it with or disconnect it from the wrist of the inner crank, as described.

6. The combination, with the frame E and with the shafts $i$ $i$ of the steering mechanism, of the head or frame $u'$, adjustable on the said frame E and applied to such shafts, substantially and for the purpose as set forth.

7. Each beveled pinion $h$, movable on its shaft $i$ and provided with a clamping-screw, $y$, in combination with the tube $z$ and its clamping-screw $a^2$, applied to the shaft and to the head or frame $u'$, as set forth.

8. The frame E, provided with the abutment $c^2$, in combination with the detachable handle-bar $m$, provided with the post $f^2$, adapted to such abutment, substantially as set forth.

9. The bracket $u$, clamped to the bar $d$ of the frame E and extended through the box $b^4$, such box being provided with a clamp-screw, $c^4$, all being substantially as set forth.

10. The shafts $i$, provided with the adjustable frame $u'$, applied, as described, to the frame E, and with the boxes $b^6$, pivoted to the said frame, as set forth.

ELI HAYWARD FOSS.

Witnesses:
R. H. EDDY,
E. B. PRATT.